F. BALZER.
REVERSING MECHANISM FOR ELECTRICALLY DRIVEN WASHING MACHINES.
APPLICATION FILED NOV. 8, 1913.

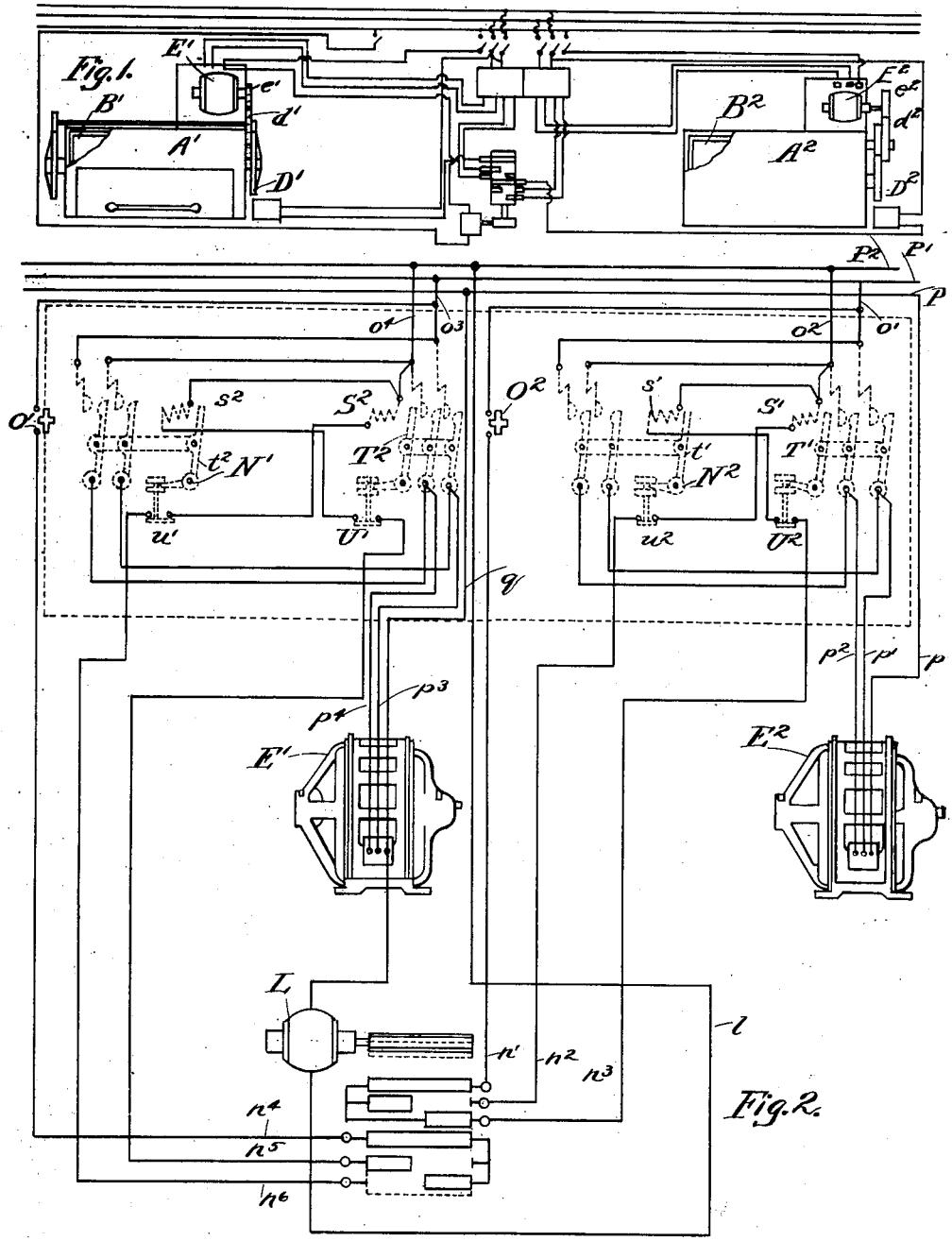

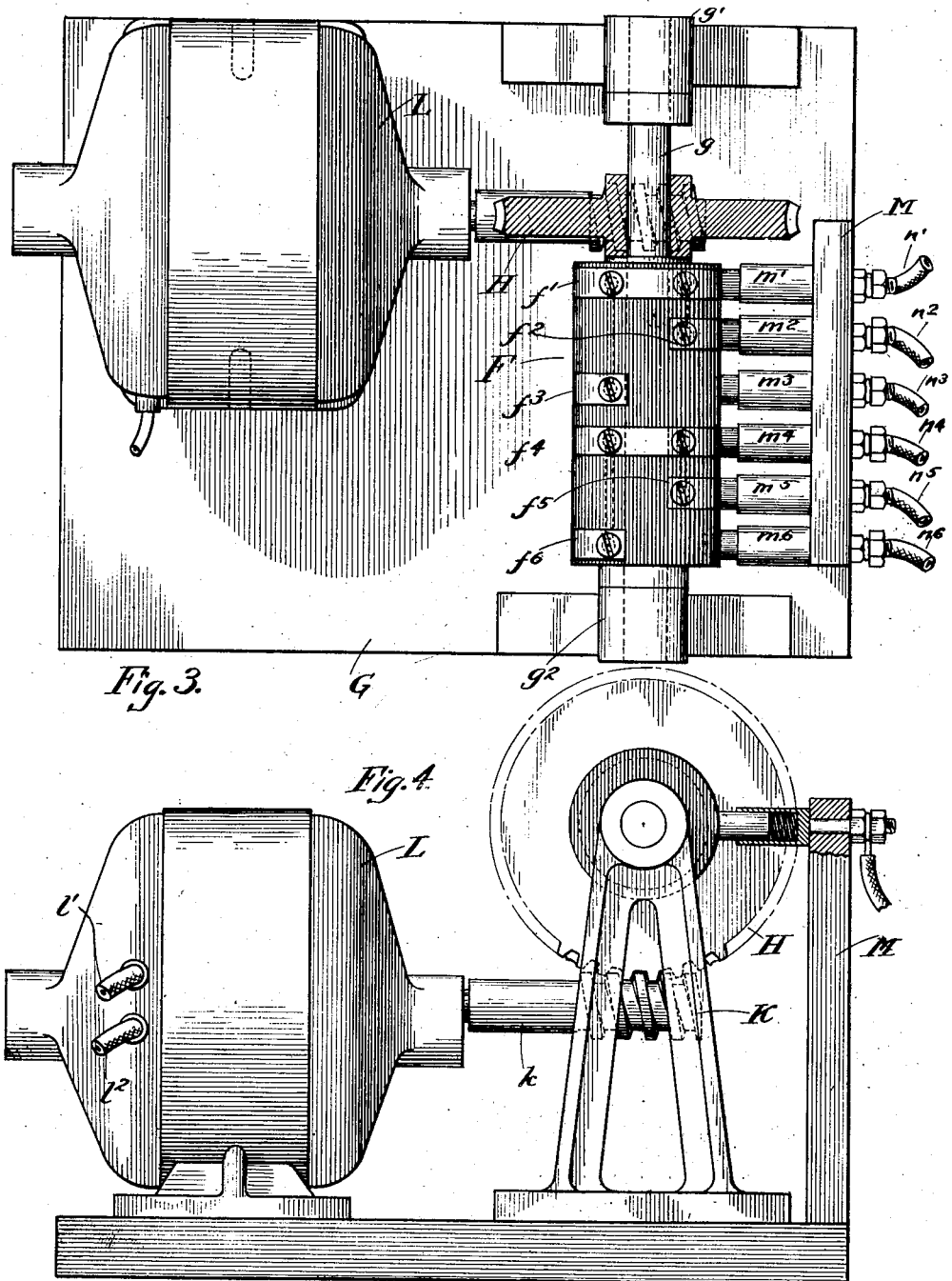

1,151,991.

Patented Aug. 31, 1915.

Witnesses:

Inventor:
Fritz Balzer
By Sheridan, Wilkinson & Scott Attys

UNITED STATES PATENT OFFICE.

FRITZ BALZER, OF CHICAGO, ILLINOIS, ASSIGNOR TO TROY LAUNDRY MACHINERY COMPANY, LIMITED, OF CHICAGO, ILLINOIS, A CORPORATION OF NEW YORK.

REVERSING MECHANISM FOR ELECTRICALLY-DRIVEN WASHING-MACHINES.

1,151,991. Specification of Letters Patent. Patented Aug. 31, 1915.

Application filed November 8, 1913. Serial No. 799,945.

*To all whom it may concern:*

Be it known that I, FRITZ BALZER, a subject of the Emperor of Germany, residing at Chicago, in the county of Cook and State of Illinois, have invented certain new and useful Improvements in Reversing Mechanism for Electrically-Driven Washing-Machines, of which the following is a specification.

My invention relates in general to automatic reversing mechanism for machines comprising rotating parts, and more particularly to mechanism for periodically reversing the cylinders of electrically driven washing machines.

In the operation of cylinder washing machines it is desirable that the direction of rotation of the cylinders should be reversed at frequent intervals in order to agitate the articles and expose all portions of them to the action of the suds, thereby thoroughly cleansing the articles.

The primary object of my invention is to provide electrically driven cylinder washing machines with electrically actuated mechanism for automatically reversing the current through the electric motors, which rotate the cylinders, at predetermined intervals.

A further object of my invention is to provide a plurality of electrically driven cylinder washing machines which may be independently driven and individually put into and out of operation, but which will be periodically reversed by a single electrically actuated mechanism for reversing the current to the motor of each machine at predetermined intervals.

A still further object of my invention is to provide a plurality of machines, each comprising an independently controlled electrically driven member, with a common electrically actuated mechanism, for periodically reversing the current to the motors of the several machines.

My invention will be more fully disclosed hereinafter with reference to the accompanying drawings, in which the same is embodied in a convenient and practical form, and in which—

Figure 5:
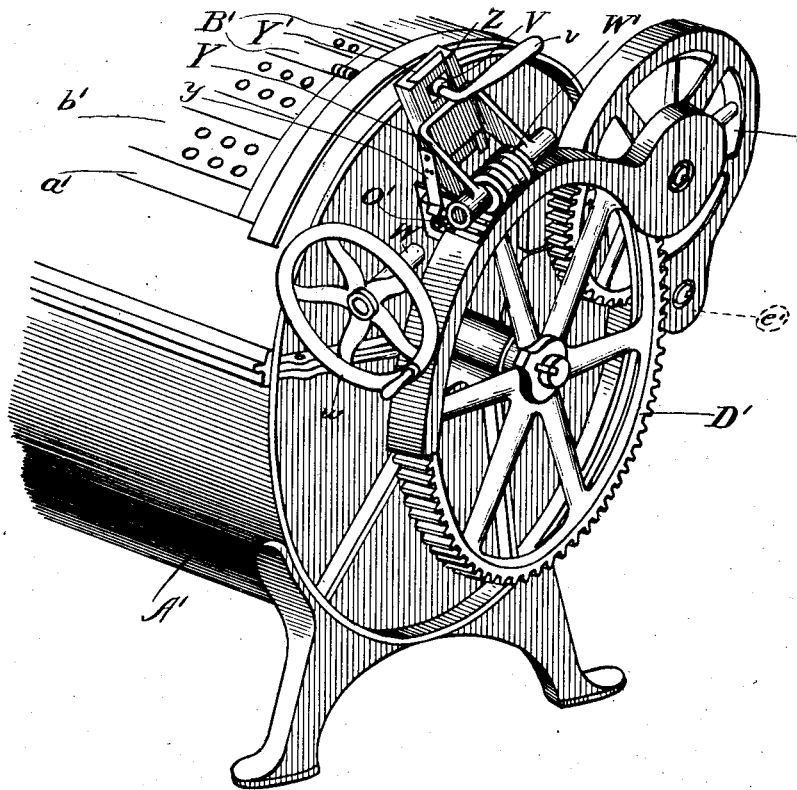
Figure 6:
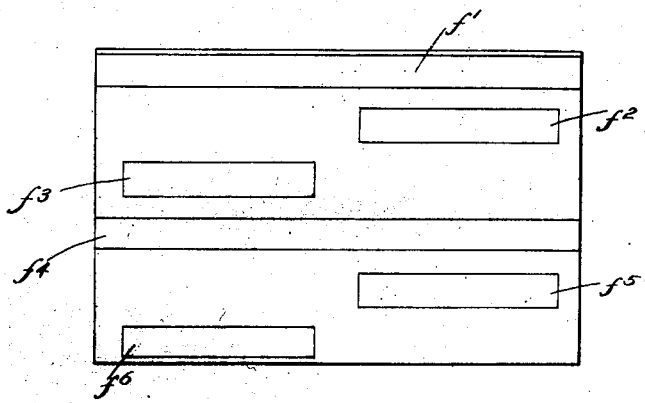

Figure 1 illustrates, somewhat diagrammatically, two cylinder washing machines equipped with my improved reversing mechanism; Fig. 2 a diagrammatic view of the electrically actuated mechanism for driving the cylinders of the machines and for reversing the current through the driving motors; Fig. 3 a plan view of the motor and commutator driven thereby for controlling the reversing switch to periodically reverse the current to the motors; Fig. 4 a side elevational view looking upwardly with respect to Fig. 3; Fig. 5 a perspective view of one end of a cylinder washing machine on which is located a switch for controlling the operation of the driving motor thereof; and Fig. 6 a developed view of the conducting plates on the commutator drum.

Similar reference characters are used to designate similar parts in the several figures of the drawings.

Reference characters A′ and A² designate the stationary tanks of cylinder washing machines in which are inclosed rotating cylinders B′ and B² for containing the articles to be washed.

D′ and D² designate gear wheels for rotating the cylinders which mesh with similar gear wheels $d'$ and $d^2$, respectively, which in turn mesh with pinions $e'$ and $e^2$, which are rotated by electric motors E′ and E². Inasmuch as the specific construction of the washing machine does not in itself constitute my invention, it is unnecessary to describe the construction and operation thereof in detail. It will further be understood that while I have illustrated my improved reversing mechanism as applied to two cylinder washing machines, yet it may be applied to any number of such machines, or in fact to a plurality of any machines comprising rotating members, the direction of rotation of which it is desired to periodically reverse.

Reference character F designates a commutator which is secured to a shaft $g$ journaled in bearings $g'$, $g^2$ mounted upon a suitable support G located in any convenient position with respect to the machines controlled thereby. The commutator F has thereon a conducting ring $f'$, which is separately electrically connected with two spaced and staggered substantially semi-circular conducting strips $f^2$ and $f^3$. A second circular conducting strip $f^4$ is also carried by the commutator F and is separately electrically connected with two substantially semi-circular staggered conducting strips $f^5$ and $f^6$. The worm wheel H is fixed upon the shaft $g$ and meshes with a worm K carried by the shaft $k$ of an electric motor L, to which the current is supplied by leads $l'$, $l^2$. The motor L may be conveniently mounted upon the support G. A bracket M projects from the support G and carries a plurality of commutator brushes $m'$, $m^2$, $m^3$, $m^4$, $m^5$, and $m^6$, which respectively contact with the conducting strips $f'$, $f^2$, $f^3$, $f^4$, $f^5$ and $f^6$ on the commutator drum F. The leads $n'$, $n^2$, $n^3$, $n^4$, $n^5$, $n^6$ are electrically connected with the respective commutator brushes.

N' and $N^2$ indicate reversing switches, the current to which is controlled by the commutator F and which in turn control the current to the motors E', $E^2$, respectively, so as to periodically reverse the current through the motors and thereby reverse the direction of rotation of the washing machine cylinders. A switch is located on each machine at a point convenient for the operator, such switch serving to make or break the circuit leading to the reversing switch of that particular machine, and thereby controlling the operation of each machine independently of the operation of the other machines. In Fig. 2 reference characters O' and $O^2$ designate such switches, which are located on the machines A', $A^2$ in any convenient manner, as for instance, in the position shown in Fig. 5, and which will hereinafter be more fully described in detail.

The electrical wiring and reversing switches may be sufficiently described in connection with the explanation of the operation of the invention. The commutator drum F is rotated at a predetermined speed by means of the motor L through the mechanism of the meshed worm K and worm wheel H. The rotation of the commutator drum electrically connects the lead $n'$ alternately with the leads $n^2$ and $n^3$ by reason of the alternate engagement of the brushes $m^2$ and $m^3$ with conductor strips $f^2$ and $f^3$, and the continuous engagement of the brush $m'$ with the conductor strip $f'$. During the connection of the lead $n'$ with the lead $n^2$ a circuit is closed through the switch $O^2$ to the lead $o'$ which is connected with the line P'. The lead $n^2$ extends through the then closed cut-out switch $u^2$ of the reversing switch $N^2$, and then through the winding of the solenoid S', to the lead $o^2$, which is connected with the line $P^2$. This circuit energizes the solenoid S', which attracts its armature T' and thereby operates the switches connected therewith so as to close a circuit through the motor by connecting the lead $o'$ with the lead $p'$, and the lead $p^2$ with the lead $o^2$. When the commutator closes the circuit through the leads $n'$ and $n^3$, a circuit is closed through the then closed cut-out switch $U^2$, through the winding of the solenoid $s'$, thence through the lead $o^2$ and line $P^2$. The circuit is completed from the line P', through the lead, $n'$, switch $O^2$ and lead $o'$. This circuit actuates the reversing switch so as to connect the lead $o^2$ with the lead $p'$, and the lead $o'$ with the lead $p^2$, thereby reversing the direction of the current through the motor E' from that which exists when the commutator connects leads $n'$, $n^2$. A similar operation of the reversing switch N' is effected by means of the commutator alternately connecting the lead $n^4$ with the leads $n^5$ and $n^6$, through the alternate engagement of the brushes $m^5$ and $m^6$ with the staggered conductor strips $f^5$ and $f^6$, while the brush $m^4$ remains continually in contact with the strip $f^4$. When the leads $n^4$ and $n^6$ are connected a circuit is completed through the then closed cut-out switch $u'$, through the winding of the solenoid $S^2$, to the lead $o^4$ and then the line $P^2$, the connection remaining the same from the lead $n^4$ through the switch O', to the lead $o^3$ and line P'. The solenoid $S^2$ then attracts the armature $T^2$ and moves the contacts connected therewith so as to close a circuit through the motor E' by connecting the lead $o^4$ with the lead $p^4$, and the lead $p^3$ with the lead $o^3$ to the line P'. The direction of the rotation of the motor E' is consequently reversed from that which is imparted to it when the leads $n^4$, $n^5$ are electrically connected.

P designates a line from which leads $p$ and $q$ extend to the motors $E^2$ and E', respectively, the latter lead being also extended to the motor L, which is also connected by a lead $l$ with the line $P^2$.

While the switch for independently controlling the operation of each machine may be of any suitable construction and located at any convenient point, yet it is preferably arranged as shown in Fig. 5. In this figure is illustrated hand operated mechanism for rotating the cylinder B' to such a position that its door $b'$ will register with the door $a'$ of the inclosing tank A', in case such doors are out of registry when the motor circuit is interrupted. A worm W' is mounted on a shaft W, which is journaled in a bracket Y provided with a portion Y' in sliding engagement with a guide Z fixed to the end of the tank A'. A guard $y$ is carried by the bracket Y. A cam V is located within an opening in the guide Y' and is provided with a handle $v$ for oscillating the same to thereby raise and lower the bracket Y and with it the worm W' into and out of mesh with the gear wheel D'. When the worm is in mesh with the gear wheel the guard $y$ overlies the switch O' and prevents its operation to close the motor circuit, thereby preventing injury to the hand operated mechanism through the accidential starting of the motor while it is in operative position.

Should the worm be lowered into mesh with the gear wheel before interrupting the motor circuit, the guard $y$ engages the switch $O'$ and moves the same to position to interrupt the motor circuit.

It will be observed that the arrangement of the conducting strips on the commutator drum is such that the circuits to the reversing switches are changed in fixed sequence and that during a slight interval between the changing of the current to each reversing switch, there is a neutral position in which no circuit is closed to the reversing switch. This is accomplished by reason of the fact that the conductor strips $f^2$ and $f^3$ which are alternately connected with the continuous strip $f'$ by the commutator brushes, are spaced apart axially with respect to the commutator so that when the commutator brush $m^2$ passes from the conductor strip $f^2$ a slight interval will elapse before the commutator brush $m^3$ passes on to the conductor strip $f^3$. The same is true with respect to the conductor strips $f^5$ and $f^6$. The interval thereby provided between each of the circuits to the reversing switches permits a slight neutral interval between the changes in the directions of rotation of the motors.

From the foregoing description it will be observed that I have invented improved reversing mechanism for automatically reversing the current through the motor, which drives the rotating member of the machine. It will be further observed by my invention a plurality of machines may be periodically reversed by common electrically actuated reversing mechanism, while each machine may be independently put into and out of operation by the attendant.

I claim:

1. The combination with a machine comprising a rotating member, of an electric motor for driving said member, a switch for reversing the current through said motor, a commutator for controlling the operation of said switch, an electric motor running at a predetermined speed for actuating said commutator, and a manually operative switch located at the machine for controlling the motor circuit to operate or discontinue the operation of the machine.

2. The combination with a plurality of machines each comprising a rotary member, of a separate electric motor for driving the rotary member of each machine, means for individually controlling the operation of each machine, a switch for reversing the current through the motor of each machine, a commutator for controlling the operation of said switch, and an electric motor running at a predetermined speed for actuating said commutator.

3. The combination with a plurality of machines each comprising a rotary member, of a separate electric motor for driving the rotary member of each machine, reversing switch mechanism for independently reversing the current to the motor of each machine, a commutator controlling the operation of said reversing switch mechanism, and an electric motor running at a predetermined speed for actuating said commutator.

In testimony whereof, I have subscribed my name.

FRITZ BALZER.

Witnesses:
GEO. L. WILKINSON,
HENRY A. PARKS.